April 10, 1934.   W. L. SCHEU   1,954,542
SOLID FUEL HEATER
Filed Aug. 26, 1931   3 Sheets-Sheet 3
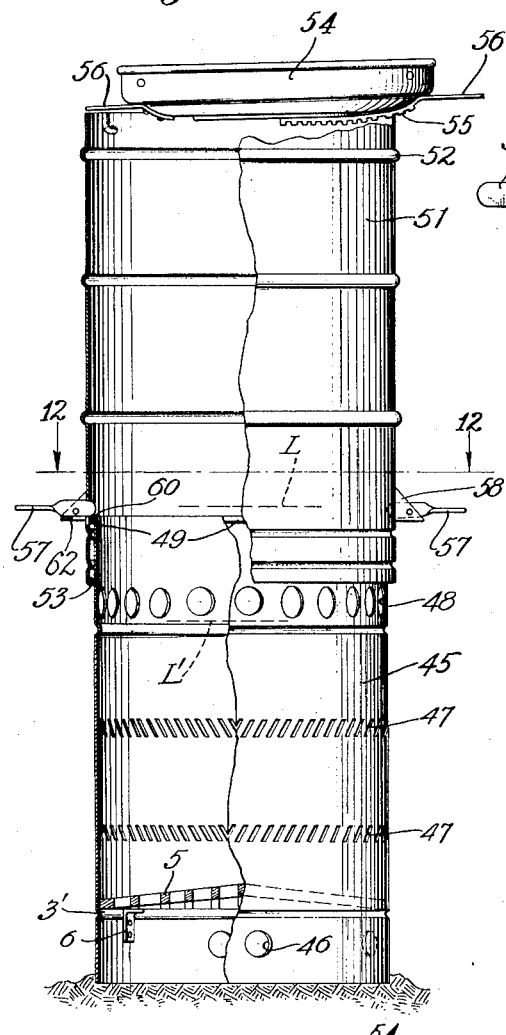
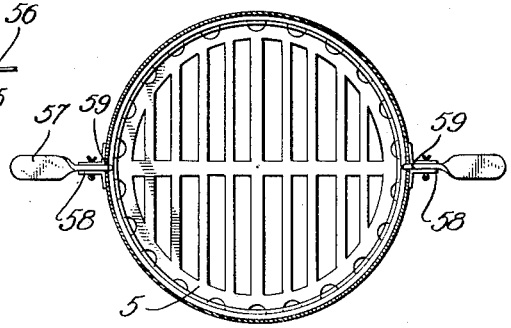
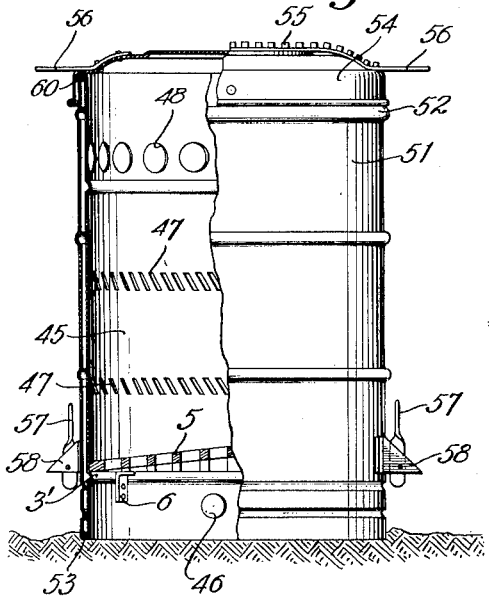
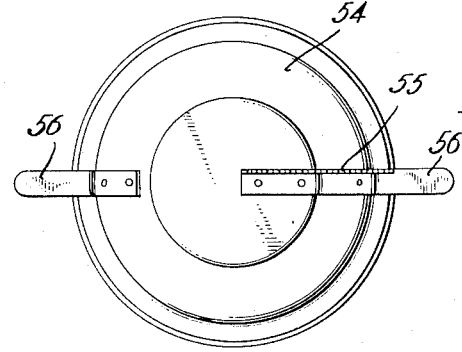
INVENTOR.
Willis L. Scheu,
BY
ATTORNEYS.

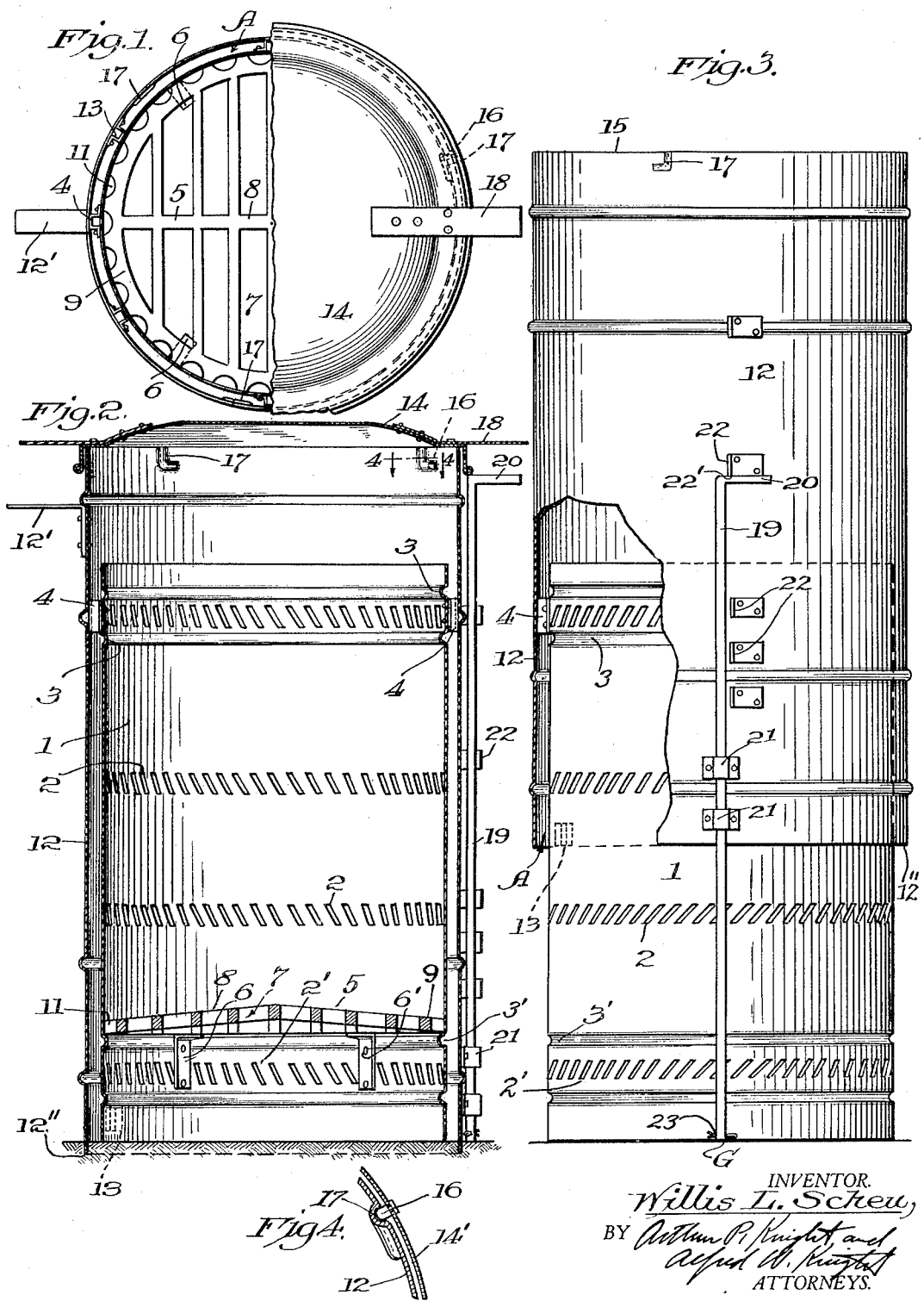

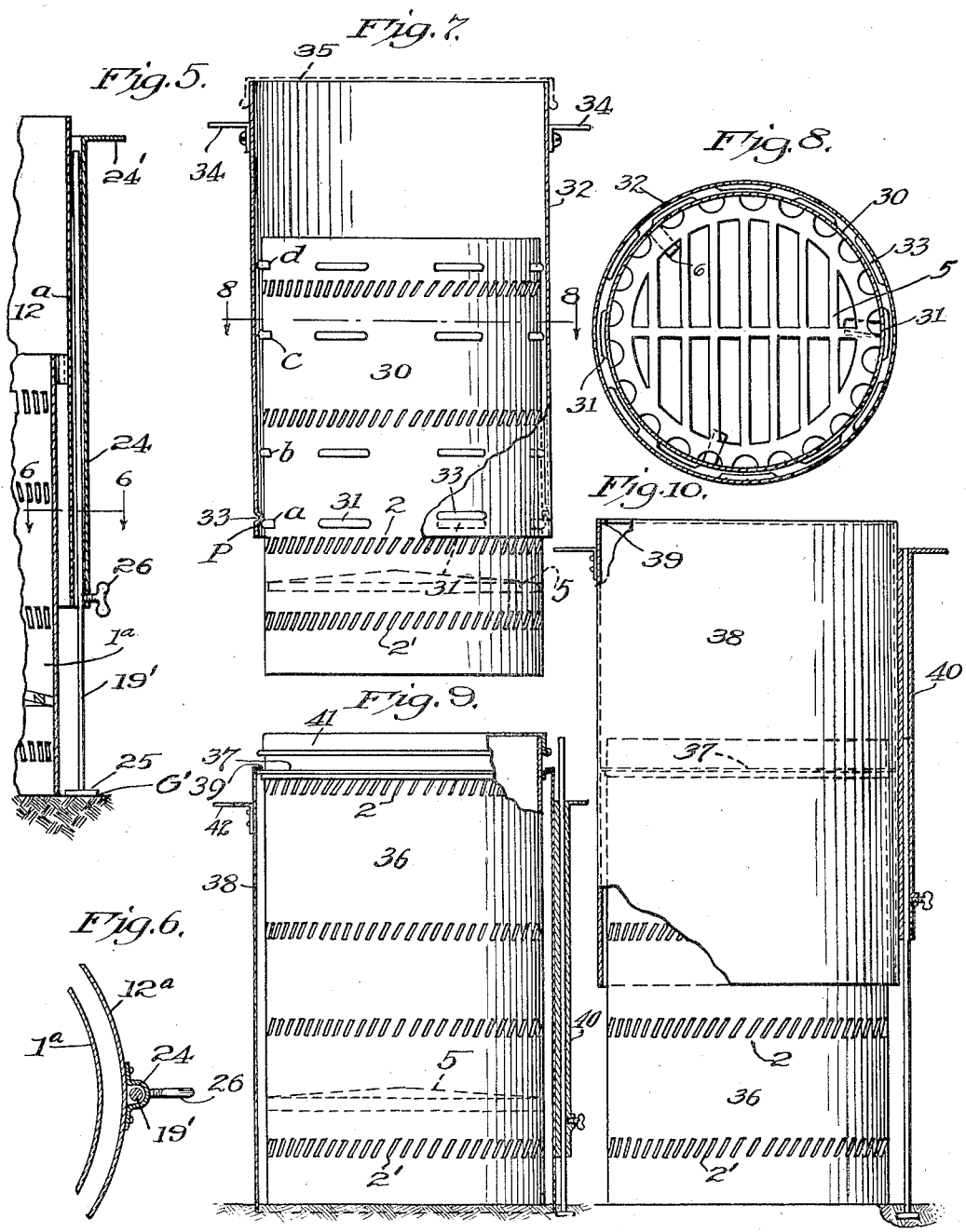

Patented Apr. 10, 1934

1,954,542

UNITED STATES PATENT OFFICE 1,954,542

SOLID FUEL HEATER

Willis L. Scheu, Ontario, Calif., assignor to Scheu Products Company Limited, Ontario, Calif., a corporation of California Application August 26, 1931, Serial No. 559,419

21 Claims. (Cl. 126—59.5)

This invention relates to heaters adapted to provide combustion of solid fuels and particularly to a portable heater for use in the heating of orchards and the like for protection thereof against damage by cold or frost.

The principal object of the invention is to provide a solid fuel heater of cheap construction and high combustion efficiency, which is easily portable and which is provided with means for effectively and quickly extinguishing the burning solid fuel therein when desired.

One of the major difficulties encountered in the operation of a solid fuel heater is that of quickly extinguishing the burning fuel. It is necessary to completely seal the combustion chamber of a solid fuel heater so that no air is allowed to contact the heated fuel in order to completely extinguish the same, as such fuel will smoulder and burn until completely consumed with only a small amount of air present to support combustion. The solid fuel heater of the present invention provides for a very quick and very complete draft shut-off when desired, obtaining a very quick extinguishing of the burning fuel, whereby fuel losses are reduced to a minimum.

An important object of the invention is to provide an orchard heater provided with an inner housing adapted to serve as a fuel container and an outer housing slidably disposed about said inner housing and adapted to be raised with respect thereto to serve as a stack for the combustion gases and to be lowered with respect thereto to serve as a seal for said heater and to extinguish the burning fuel therein by preventing access of draft air thereto.

A further important object of the invention is to provide an orchard heater provided with removable closure means at the upper end thereof adapted to serve as adjustable draft regulating means during operation of the heater and also as draft sealing means for extinguishing the heater.

A particular object of the invention is to provide a solid fuel heater having improved draft regulating means adapted to provide complete control of the rate of burning of the solid fuel within said heater.

A further object of the invention is to provide a fuel supporting member for a solid fuel heater which is adapted to resist sagging or deformation when heated under load of such fuel.

An important object of the invention is to provide a heater having an inner and an outer housing, and a removable closure member adapted to be interlocked with said outer housing at the upper portion thereof, in such manner that said outer housing is rotatable with respect to said inner housing upon rotation of said closure member by means of handles conveniently disposed thereon, so as to obtain a sealing engagement of the lower portion of said outer housing with the soil and effectively prevent access of air to the interior of said heater.

A further object of the present invention is to provide a solid fuel heater provided with advantageous means for obtaining semi-automatic draft regulation for the burning fuel, that is, means for providing increased draft to the fuel at the start of operation of the heater and for automatically diminishing the draft thereto when the fuel is consumed to a predetermined point.

Other objects will be brought out in the following description or will be readily apparent therefrom.

The solid fuel heater of the present invention comprises, in general, an inner housing adapted to serve as a fuel container, open at its upper end and provided with a suitable fuel supporting member adjacent the lower portion thereof, and a substantially imperforate outer housing slidably disposed concentrically about said inner housing and also open at its upper end and adapted to be lifted and held in a raised position with respect to said inner housing to serve as a stack for said heater when in said raised position or to be lowered into contact with the ground or soil and obtain a seal therewith so as to close off any draft to said heater.

The inner housing is preferably provided with a plurality of draft openings peripherally disposed about said housing at various successively higher levels, so as to admit draft air to the interior thereof when the outer housing is raised, for the support of combustion of the solid fuel within said housing. The heater is preferably provided with a removable cover which may be securely fastened to the upper end thereof when desired so as to provide an air or draft seal over the upper portion thereof. Said removable cover may engage the upper end of either the outer or inner housing, and, in the form in which the cover engages the outer housing, means are preferably provided for rotatably interlocking said cover to said outer housing, whereby said outer housing is rotatable with respect to said inner housing upon rotation of said cover. Said outer locking means is preferably also adapted to cause engagement of the cover with said outer housing in such manner as to provide for raising of said housing by means of said cover, by lifting on suitable handle means disposed on said cover.

The outer housing may be, if desired, provided with height regulating means whereby said outer housing may be positioned at any suitable height above the ground with respect to said inner housing so as to provide the desired amount of draft therefor by means of regulation of the height of the stack and of the admission of air to the draft openings of the inner housing. Said height regulating means may comprise positioning means on the outer housing adapted for adjustable engagement with the ground or with positioning means on the inner housing. The outer housing may, if desired, be formed sufficiently larger than the inner housing as to provide an annular space therebetween through which draft air may pass upwardly to said draft openings in said inner housing.

The accompanying drawings illustrate certain embodiments of the present invention, and referring thereto:

Fig. 1 is a partly sectional plan view of one form of the device with the lid in place;

Fig. 2 is a sectional side elevation thereof showing the outer housing in lowered position;

Fig. 3 is a side elevation thereof with a portion of the outer housing broken away, said outer housing being in an elevated position and the cover removed;

Fig. 4 is a detail of a portion of the device shown in Fig. 2, taken on line 4—4 therein;

Fig. 5 is a partly sectional detail of an alternative form of height regulating means for the outer housing;

Fig. 6 is a plan view thereof;

Fig. 7 is a partly sectional side elevation of an alternative form of solid fuel heater according to my invention;

Fig. 8 is a transverse section of the heater taken on line 8—8 in Fig. 7, the outer housing being rotated so as to disengage the positioning means;

Fig. 9 is a partly sectional elevation of another alternative form of heater, in draft closed position;

Fig. 10 is a similar view of the same heater, with the outer housing raised to a burning position;

Fig. 11 is a partly sectional view of an alternative form of heater, the outer housing thereof being raised to burning position;

Fig. 12 is a transverse section thereof on line 12—12 in Fig. 11;

Fig. 13 is a partly sectional view of the above form of heater in draft closed position;

Fig. 14 is a detail of the removable cover thereof.

The solid fuel heater of the present invention may comprise, as shown in Figs. 1 to 4, an inner, substantially cylindrical open-ended housing 1, formed of light sheet metal such as galvanized sheet iron or the like, having a plurality of draft openings 2 and 2' provided therein at various successively higher levels. The inner housing 1 is preferably provided with re-enforcing beads 3 at various levels therein so as to increase the structural strength thereof.

A fuel support member 5 is provided within said housing adjacent the lower end thereof and preferably above at least one level of draft openings, such as 2', said member 5 being adapted to rest on any suitable form of support, such as, for example, a plurality of supporting brackets 6 secured to the housing wall in any suitable manner, as by means of rivets 6' and is preferably also adapted to rest on one of the re-enforcing beads 3'. The housing 1 is preferably also provided with a plurality of spacing members 4 secured to and disposed at intervals about the periphery thereof adjacent the upper end.

The fuel supporting member is preferably formed as a shallow vertical cone having a plurality of transverse openings 7 extending either side of a central rib 8 and having a serrated outer edge 9, the serrations of which provide a plurality of substantially semi-circular openings 11 between said outer edge and the inner wall of the housing 1. The openings 7 allow the major portion of the draft air admitted through the openings 2' to progress upwardly through the fuel over the central portion of the heater and the openings 11 allow the remainder of such air to pass upwardly around the inner wall of the housing, providing a uniform distribution of air to the fuel disposed on said support member.

The outer housing 12, of somewhat greater diameter and height than the inner housing, is disposed surrounding said inner housing in slidable contact with the outer faces of the spacing members 4, and is preferably provided with a plurality of spacing members 13 secured thereto adjacent the lower end thereof, adapted to slidably contact the outer wall of the housing 1, said spacing members 4 and 13 being disposed in offset relation so as to provide for removal of the outer housing from around the inner housing when desired by lifting said outer housing away from said inner housing.

The housing 12 is of sufficiently large internal diameter to provide an annular space A between said housing and the outer wall of the housing 1, through which air may pass upwardly to the openings 2 when said housing is in raised position.

The outer housing is provided with closely fitting closure means at the upper end thereof. Said closure means may comprise a cap 14 having a depending rim portion 14' adapted to fit over the upper end 15 of said housing, said rim being provided with a plurality of inwardly projecting pins or beads 16 adapted to individually engage a plurality of bayonet-type slots 17 in the upper edge of said housing. The cap 14 is preferably additionally provided with handles 18 projecting laterally each side of said cap whereby said cap may be rotatably moved to cause said pins to engage said slots.

The height regulating means which provides for adjustable positioning of the outer housing above the ground may comprise a structure as shown in Figs. 2 and 3, or for example, may comprise one as shown in Figs. 5 and 6. In the form of height regulating means shown in Figs. 2 and 3, an adjusting-rod 19, formed with a bent-over handle portion 20 at the upper end thereof, is slidably secured to the outer housing 12 as by means of hasps 21 and is adapted to provide positioning support for said outer housing by selective engagement with the under side 22' of any one of a plurality of support arms 22 disposed at a plurality of successively higher levels along a substantially vertical line on the outer wall of said housing, the lower end of said rod being adapted to engage the ground as at G. Said support arms are rigidly secured to said housing at such points in any suitable manner as, for example, by welding or by means of rivets, as shown.

Suitable means are preferably provided at the lower end of the rod 19 so as to prevent withdrawal thereof from the hasps 21, and, for example, such means may comprise a cotter-pin or the like extending through the lower end of said rod, as at 23. The outer housing is preferably also provided with handle means such as is shown at 12', which may be used when raising said housing in adjusting the same to proper position.

In the form of height adjusting device shown in Figs. 5 and 6, the adjusting-rod 19' is slidably disposed within a tubular member 24 secured to the outer wall of the outer housing 12a, said rod being provided with a foot 25 adapted to engage the ground as at G' and said tubular member being provided with a holding screw 26 adapted to engage the rod 19' and hold the same firmly in contact with the side wall of the housing in any desired position of elevation about the inner housing 1a. The tubular member 24 may be provided, if desired, with a laterally projecting handle portion 24' at its upper end so as to provide convenient means for lifting the housing upwardly to the desired position.

In the operation of the solid fuel heater of the present invention, the cover 14 is removed from the outer housing 12 and the inner housing 1 is filled with the desired quantity of solid fuel, such as coke briquettes or the like. As a general rule I have found it advisable to soak a few of the briquettes in kerosene or some light oil until thoroughly saturated and then place a few of said oil-soaked briquettes in with the charge of ordinary briquettes said oil-soaked briquettes being quite easily ignited by pouring a small quantity of burning lighting fluid, such as a mixture of gasoline and kerosene, over the mass of fuel within the housing 1.

In the form of heater shown in Figs. 2 and 3, either before or after lighting the solid fuel, the outer housing 12 is raised off the ground to the correct height to provide the desired amount of draft by lifting the same by means of handle 12' or by means of handles 18 on the cap 14, with said cap in engagement with the outer housing and positioning the handle portion 20 of the rod 19 beneath one of the support arms 22, as shown in Fig. 3, the weight of said outer housing being supported on the ground through the rod 19 as at G.

In the form of device shown in Figs. 5 and 6, the outer housing 12a is raised off the ground by lifting on the handle 24' and then tightening the holding screw 26, the weight of said outer housing being carried by the foot portion 25 of the rod 19'.

When the solid fuel within the heater is burning satisfactorily, the draught may be regulated if desired by changing the degree of elevation of the outer housing, but in general, I have found that after a little experience in handling the heater, the height of the outer housing may be set at the proper point at the starting thereof and will not need to be changed unless the temperature conditions vary considerably so as to require more or less heat from the heater.

In the operation of the heater, air is drawn in through the openings 2' and 2, such air as comes in through the openings 2' being distributed over the bottom of the fuel charge as above described and allowed to rise substantially uniformly through the mass, a portion of such admitted air passing upwardly through the openings 11 in the outer edge of the fuel supporting member 5. Air is drawn upwardly through the annular space A and a portion thereof is drawn inwardly through the upper rows of openings 2 providing for combustion of the solid fuel, the remainder of such air being delivered above the top of the housing 1 so as to provide for combustion of the combustible vapors liberated within the interior of the housing 1. It will thus be seen that a portion of the combustion of the solid fuel within the inner housing takes place directly by contact of air admitted through the openings 2 and 2', and the remainder of the combustion is obtained above the inner housing upon contact of the combustible vapors, liberated in conjunction with the combustion within said inner housing, with air admitted to above said inner housing through the space A.

When it is desired to extinguish the heater, the handle 20 is rotated clear of the supporting member 22, Fig. 3, or the screw 26, Fig. 5 is loosened, and the outer housing is allowed to drop. The cover 14 is then placed over the top of the outer housing with the pins 16 in engagement with the slots 17 and the lid and the outer housing are rotated by means of the handles 18 so as to work the lower edge 12'' into the soil, effectively sealing the heater from all access of air, and combustion ceases within the heater. If it is desired to merely interrupt the burning of the heater so as to be able to start the heater immediately, it is simply necessary to position the outer housing with the lower edge thereof somewhat above the lower row of openings 2, as shown, for example, in Fig. 3, securing the lid 14 in place on the upper end of the outer housing, in which case there will be a slight circulation of air to within the lower portion of the inner housing inwardly through the openings 2' and outwardly through the lower row of openings 2, maintaining slow combustion in the lower portion of the heater. Normal combustion of the heater may be regained by removing the cover, reestablishing normal draft conditions.

With the use of a fuel support member of the form described herein, sagging of said support due to the weight of fuel thereon when said support is in heated condition is substantially eliminated by reason of the conical shape of said support. The raised center portion of said support provides an arched construction having many times the strength of a plane support. It is particularly advisable to provide a fuel support which will not sag or otherwise deform in use for the reason that said support would become tightly wedged within the inner housing and would possibly deform said housing so as to interfere with easy vertical movement of the outer housing.

In the form of heater shown in Figs. 7 and 8, the heater in general is similar to that shown above, but with the exception that the height positioning means for the outer housing comprises means disposed both on the inner housing and the outer housing. Said positioning means may comprise a plurality of outwardly projecting beads 31 on the inner housing 30 and a plurality of inwardly projecting beads 33 on the outer housing 32. The beads may be formed in the side walls of the respective housings and are preferably uniformly spaced about the periphery of said housings and of such length and spacing that the distance between two adjacent beads in any one row is greater than the length of the individual beads on the other housing. The beads 31 are disposed on the inner housing at a plurality of various successively higher levels, as shown at a, b, c and d, the beads at a higher level, c for example, being preferably arranged with the same orientation as the beads in a lower row so that the beads are disposed one above the other in vertical rows. The beads in the outer housing are arranged in a single row adjacent the lower end thereof and are shown as provided with the same length, spacing and angular disposition as the beads in the inner housing. The inner housing 30 is provided with a plurality of draft openings 2 and 2' as above and is also provided with a suitable fuel support which may be of the form shown at 5 in Figs. 1 and 2, which may rest on a plurality of suitable brackets such as shown at 6 in said figures and in Fig. 8.

The height positioning means above described is operated by rotating the outer housing 32 with respect to the inner housing 30, by means of handles 34 conveniently disposed on said outer housing, so as to position each bead 33 intermediate two adjacent beads 31 as shown in Fig. 8, whereupon the outer housing may be raised or lowered to the desired height and the outer housing again rotated to position each bead 33 vertically over each bead 31 in any one row, such as $a$, and allowing said first named beads to rest on said second named beads as shown at P. When it is desired to close the heater, the outer housing is rotated a sufficient amount in either direction so as to disengage the respective beads and the housing is allowed to drop to the ground so as to form a seal therewith as in the first described form and a suitable cover, such as is shown in dotted lines at 35, is placed over the upper end of the outer housing to provide for a seal at the upper end.

In the form of device shown in Figs. 9 and 10, the inner housing 36, provided with draft openings 2 and 2' and a fuel support 5 which may rest on suitable supporting brackets such as shown at 6, Figs. 1 and 2, as above described, is provided with a projecting annular flange 37 adjacent the upper end thereof above the uppermost row of draft openings, and the outer housing 38 is provided with an inwardly projecting annular flange 39 at the upper end thereof adapted to provide sealing engagement with said flange 37 when said outer housing is in lowermost position, as shown in Fig. 9. The outer housing 38 is of such height that when the lower edge thereof is substantially at or slightly below the lower edge of the inner housing, so as to firmly engage the soil, the flange 39 at the upper end thereof engages flange 37 on the inner housing. Said outer housing is provided with suitable height adjusting means 40 which may be of the form shown in Figs. 5 and 6 for example, or of any of the other forms herein described, and the inner housing is provided with a suitable removable cover such as shown at 41.

In the operation of the form of heater last described, when it is desired to extinguish the same, it is merely necessary to release the height adjusting means so as to allow the outer housing to drop to the ground, and then rotate said outer housing by means of the conveniently placed handle 42 until the flange 39 comes firmly in contact with the flange 37, the bottom of said heater then being sealed off at the ground as above described. The cover 41 is then placed over the open upper end of the inner housing and the heater is completely sealed.

In the form of heater shown in Figs. 11 to 14, the inner housing 45, cylindrical in form and open at the upper and lower ends, is provided as before with a fuel support member 5 supported by brackets 6 and the inwardly projecting re-enforcing bead 3' substantially as shown in Figs. 2 and 3, and is further provided with a plurality of draft openings 46 below the fuel support member, one or more rows of openings 47 of the type shown at 2 in Figs 2 and 3 above the fuel support member, and a row of relatively large openings 48 adjacent the upper end of said housing, the utility of which will be disclosed hereinafter.

The outer, imperforate housing 51, of substantially the same height as the inner housing 45 and provided with a plurality of re-enforcing beads 52, is of suitable diameter as to be slidably disposed about the inner housing in light contact with an outwardly projecting re-enforced beading 49 at the upper edge of the said inner housing and is preferably provided with an inwardly projecting re-enforced beading at the lower end thereof in contact with the exterior wall of the inner housing, as shown at 53, providing relatively easy upward and downward sliding movement of said outer housing on said inner housing with but a minimum of clearance between said housings.

A removable closure means is preferably provided for the heater which may comprise a cover or cap 54 adapted to be interlocked with the outer housing at the upper end thereof in the same manner as the cap 14 is interlocked with the outer housing 12, Fig. 2, as, for example, by means of a bayonet-type interlocking means above described. The cap may be provided with means for positioning the same over the upper end of the outer housing in inverted position, as shown in Fig. 11, so as to provide draft regulation for the heater and such means may comprise a notched member 55 formed as a flange on one of the handles 56, the notches of said member being at different distances from the center of said cover and adapted to engage the upper edge of the outer housing, as shown. The cap, when in draft regulating position, is adapted to rest on the upper edge of the housing 51 with the other of said handles 56 resting on the said edge opposite the notched member, as shown, or when the cap is positioned so as to offer a larger draft opening than is shown in Fig. 11, the cap must rest on the upper edge of the housing at the points at which the cap overlaps the housing. The cap 54 is prevented from dropping into the outer housing by virtue of the fact that said cap is necessarily of somewhat larger diameter than said housing in order to fit over the same to obtain sealing engagement therewith.

The outer housing is preferably provided with suitable height positioning means adapted to position the same at such a height that the lower edge thereof is supported slightly above the row of openings 48, in which position the housing serves as a stack, and said positioning means may comprise one or more levers 57 pivotally mounted in hangers 58 and adapted to swing in a substantially vertical arc from a substantially vertical position free of engagement with the inner housing, as shown in Fig. 13, to a substantially horizontal position, in which their inner ends 61 extend through slots 59 in the outer housing and rest upon the inner housing at the upper edge thereof as at 60. When in said last-mentioned position, the levers 58 engage bearing portion 62 on hangers 58 and are prevented from further turning movement, thus serving to hold the outer housing in raised position.

In the operation of the above form of heater, the outer housing is raised with respect to the inner housing by means of the cap handles 56 with the cap 54 in engagement with the said outer housing, the levers 57 are moved outwardly so as to cause engagement of the inner ends thereof with the upper edge of the inner housing as shown in Fig. 11, and the cap is then removed. The heater may then be filled with a suitable solid fuel to a level such as is indicated by the dotted line L and the fuel ignited in any suitable manner, as above described. As the fuel in the upper portion of the inner housing burns, considerable combustion air is admitted thereto through the openings 48 which will provide very rapid combustion of the fuel and allow the heater to deliver a great quantity of heat almost immediately after the lighting thereof. As the fuel is consumed, however, and the level thereof drops to a point such as shown by the dotted line L', the openings 48 no longer supply combustion air to the burning fuel and the support of combustion for said fuel is provided solely by the openings 47 and 46, and, the heater will burn with considerably diminished intensity. After the fuel has been burned to the level L', the openings 48 serve to admit air directly to the stack, which air is heated by the combustion gases evolved from the burning fuel and made available for heating. This direct inflow of air through the openings 48 under these conditions serves to still further diminish the rate of combustion, as it reduces the draft available for drawing air in through openings 46 and 47 and through the fuel bed.

This feature provides a very advantageous operation of the heater inasmuch as the normal conditions under which the heater will be operated require a maximum delivery of heat to the orchard when the heaters are lighted, which heat may be slacked off after the danger point has been passed, and it is customary, with the conventional type of heater to extinguish a certain percentage of the heaters after the temperature of the orchard has been sufficiently raised.

During the operation of the sheater, with the outer housing in raised position, as above described, said outer housing serves, as before, as a stack for inducing a draft through the burning fuel bed, and draft regulation of the burning fuel may be obtained by placing the cap 54 on the upper end of the outer housing, as shown in Fig. 11, adjusting the notched member 55 so that the cap is positioned over the heater to the desired extent. With the cap placed with the center thereof substantially over the outer edge of the outer housing, said cap will cover approximately forty percent (40%) of the stack opening and may be adjusted between positions covering from forty percent (40%) to one hundred percent (100%) of said opening.

When it is desired to extinguish the heater, the levers 57 may be raised to substantially vertical position, releasing the engagement thereof with the inner housing, and the outer housing is allowed to drop into lowered position, after which the cap may be placed over the upper end of the housing and the lower end of said housing worked slightly into the ground to obtain a seal therewith as before, as shown in Fig. 13.

It will be apparent that numerous modifications of the several structures herein described may be made, either by combining features of one with the other or by providing changes in form of the several parts of the structures, such as for example, by the use of a closure means as described in connection with the last form of heater with any of the earlier described forms or by the use of the height positioning means shown with any one form in place of the means shown with another form, and it is not intended that this invention be limited to the particular forms herein described.

I claim:

1. A solid fuel heater comprising an inner housing open at the upper end and having perforate side walls and a fuel support adjacent the lower end thereof and an outer housing open at the upper end and having substantially imperforate side walls surrounding said inner housing and vertically slidable to a raised position so as to admit air to the interior of said inner housing and serve as a draft-inducing stack, and to a lowered position to provide sealing engagement with the soil at the lower extremity of said outer housing and obstruct the admission of air to the interior of said inner housing.

2. A solid fuel heater as set forth in claim 1, said outer housing being provided with releasable positioning means adapted to engage the upper edge of the inner housing when moved to said raised position and hold said outer housing in such position.

3. A solid fuel heater as set forth in claim 1, and comprising in addition, a removable cover adapted to engage the upper end of said heater.

4. A solid fuel heater as set forth in claim 1, and comprising in addition, a removable cover for said heater adapted to engage the upper end of said outer housing.

5. A solid fuel heater as set forth in claim 1 and comprising in addition a removable cover for said heater adapted to engage the upper end of said inner housing.

6. A solid fuel heater as set forth in claim 1, said outer housing being provided with means for positioning the same at various heights above the ground so as to vary the draft for said heater.

7. A solid fuel heater as set forth in claim 1, said outer housing being provided with positioning means thereon, said positioning means being adapted to engage the ground and position said outer housing at any one of a plurality of positions above the ground.

8. A solid fuel heater as set forth in claim 1, said inner and outer housings being provided with coacting positioning means for positioning said outer housing at any one of a plurality of different heights with respect to said inner housing.

9. A solid fuel heater comprising a substantially cylindrical inner housing, a fuel support disposed within said housing adjacent the lower end thereof, a plurality of draft openings in the side wall of said housing above and below said fuel support, said housing being open to the atmosphere at the upper end thereof, and a substantially cylindrical outer housing having an open upper end and substantially imperforate side walls surrounding said inner housing, said outer housing being vertically slidable to a raised position so as to admit air to said draft openings and serve as a draft-inducing stack for said heater, and to a lowered position to provide sealing engagement with the soil at the lower extremity thereof and obstruct admission of air to said draft openings, means for releasably holding said outer housing in said raised position, and a removable cover adapted to engage the upper end of said heater.

10. A solid fuel heater as set forth in claim 9, said outer housing having in addition means for positioning the same at various heights above the ground.

11. A solid fuel heater comprising an inner housing open at the upper end adapted to receive a body of solid fuel and provided with a plurality of relatively large air inlet openings in the upper portion of the side wall thereof and with a plurality of additional air inlet openings below said first named openings, an imperforate outer housing slidably mounted around the inner housing and having an open upper end, and means for supporting said outer housing in position above all of said air inlet openings in said inner housing so as to admit air through said inlet openings and whereby the outer housing serves as a stack for creating draft therethrough.

12. A solid fuel heater as set forth in claim 11, said outer housing being also adapted to be lowered into sealing engagement with the soil around said inner housing so as to obstruct the admission of air through said air inlet openings.

13. A solid fuel heater as set forth in claim 11, said outer housing being also adapted to be lowered to a position around said inner housing and in sealing engagement with the soil so as to obstruct admission of air through said air inlet openings, and said heater further comprising a cover adapted to be removably mounted upon the upper end thereof.

14. In a solid fuel heater, housing means adapted to receive a body of fuel and provided with an open upper end and with a plurality of air inlet openings in the side wall thereof, and a cover adapted to be mounted in position over said open upper end and having a depending flange adapted to fit around and in tight engagement with the upper end of said housing means, said cover being also adapted, when removed from such tight engagement, to rest in inverted position upon the upper end of said housing means and partially obstruct said open upper end and being provided with means adapted to engage the upper end of said housing means, when in such inverted position, and positively position said cover in any one of a plurality of partially obstructing positions while providing for transverse adjustment of said cover with respect to said housing means.

15. In a solid fuel heater, a construction as set forth in claim 14, said positioning means for said cover comprising a positioning member secured to the cover and projecting downwardly therefrom when said cover is in inverted position and provided at its lower edge with a plurality of notches at different distances from the center of said cover adapted to engage the upper edge of said housing means.

16. A solid fuel heater comprising: a substantially cylindrical inner housing; a fuel support disposed within said housing adjacent the lower end thereof; a plurality of draft openings in the side wall of said housing above and below said fuel support; and a substantially cylindrical outer housing having an open upper end and substantially imperforate side walls surrounding said inner housing, said outer housing being vertically slidable to a raised position so as to admit air to said draft openings and to a lowered position to provide sealing engagement with the soil at the lower extremity thereof and obstruct admission of air to said draft openings; sealing means on said inner housing adjacent the upper end thereof and above the uppermost draft openings; and sealing means on the upper end of said outer housing adapted to engage the sealing means on said inner housing when said outer housing is in lowered position.

17. A solid fuel heater as set forth in claim 16, said inner housing having a portion thereof projecting upwardly from said sealing means, and said heater comprising in addition: a removable cover adapted to engage said last-named portion in sealing engagement therewith.

18. A solid fuel heater comprising an inner housing open at its upper end and provided with openings in the side wall thereof, a fuel support adjacent the lower end of said housing, an outer housing slidably disposed around said inner housing and also open at its upper end but having substantially imperforate side walls, said outer housing being vertically slidable to a raised position so as to admit air to said openings in the side wall of the inner housing and to a lowered position to substantially cut off the admission of air to said openings, and means for releasably holding said outer housing in said raised position.

19. A solid fuel heater as set forth in claim 18, and comprising in addition a removable cover for the upper end of said heater.

20. A solid fuel heater comprising a substantially cylindrical inner housing; a fuel support disposed within said housing adjacent the lower end thereof, a plurality of draft openings in the side wall of said housing above and below said fuel support, said housing being open to the atmosphere at the upper end thereof, a substantially cylindrical outer housing having substantially imperforate side walls surrounding said inner housing and vertically slidable with respect to said inner housing to a raised position so as to admit air to said draft openings and to a lowered position to provide sealing engagement with the soil at the lower extremity thereof and obstruct admission of air to said draft openings, said outer housing being provided with a removable cover adapted for engagement with the upper end thereof, and said cover and said outer housing being provided with means engageable with one another so as to cause rotation of said outer housing upon rotation of said cover, and said cover being provided with handle means for effecting rotation thereof.

21. A solid fuel heater comprising a substantially cylindrical inner housing; a fuel support disposed within said housing adjacent the lower end thereof, a plurality of draft openings in the side wall of said housing above and below said fuel support, said housing being open to the atmosphere at the upper end thereof, a substantially cylindrical outer housing having substantially imperforate side walls surrounding said inner housing and vertically slidable with respect to said inner housing to a raised position so as to admit air to said draft openings and to a lowered position to provide sealing engagement with the soil at the lower extremity thereof and obstruct admission of air to said draft openings, said outer housing being provided with a removable cover and said housing and said cover being provided with means engageable with one another so as to cause raising of said outer housing upon raising of said cover, and said cover being provided with handle means for effecting raising thereof.

WILLIS L. SCHEU.